UNITED STATES PATENT OFFICE.

JOHN A. SCHAEFFER, OF JOPLIN, MISSOURI, ASSIGNOR TO PICHER LEAD COMPANY, OF JOPLIN, MISSOURI, A CORPORATION OF MISSOURI.

METHOD OF MANUFACTURING BASIC LEAD CHROMATE.

1,181,172.  Specification of Letters Patent.  Patented May 2, 1916.

No Drawing.  Application filed September 24, 1915.  Serial No. 52,467.

*To all whom it may concern:*

Be it known that I, JOHN A. SCHAEFFER, a citizen of the United States of America, residing in the city of Joplin, in the county of Jasper, in the State of Missouri, have invented a certain new and useful Improvement in the Method of Manufacturing Basic Lead Chromate, of which the following is a true and exact description.

My invention relates to the manufacture of basic lead chromate, a substance having the accepted formula

$PbCrO_4.PbO$ or $PbCrO_4.Pb(OH)_2$.

In the manufacture of colors the substance is known as American vermilion, orange chrome, chrome red and chrome scarlet.

The object of my invention is to provide a new method of manufacturing the basic lead chromate of greater cheapness and simplicity than the methods now in use, and capable at the same time of producing the substance in the best physical and color conditions.

My invention is based on my discovery that very finely divided litharge, formed by converting ordinary litharge into a vapor or fume and collecting the fume in bags or screens has, by reason of its extremely fine state of division and high reactivity, the power to unite directly and completely with the chromates and di-chromates of potassium and sodium and form basic lead chromate without the use of caustic alkali or other chemical reagents, and my invention accordingly consists in mixing with a solution of the chromates or di-chromates of the alkali metals mentioned or mixtures of such chromates and di-chromates, a paste of the volatilized litharge in water to form the basic lead chromate.

While the basic lead chromate forms promptly on the mixing of the paste and solution, it is desirable to boil the mixture to secure the best color effects, the boiling being continued until the desired shade of color is observed.

In practice I have obtained excellent results by the following methods: A solution of five parts of sodium chromate was made in water. To this was added while boiling, a paste of 13.75 parts of the volatilized litharge in water. The basic lead chromate is formed at once and improved in color by boiling. When the desired color was observed the precipitate was thoroughly washed and when dried was suitable for commercial use.

In using potassium di-chromate, I added to a boiling solution of five parts of the di-chromate, fifteen parts of the volatilized litharge in water. The treatment was the same as above described and the result equally satisfactory.

In using sodium di-chromate, I added to a boiling solution of five parts of the di-chromate, 17.2 parts of the volatilized litharge in water. The treatment was the same as above described and the result satisfactory.

In using potassium chromate, I added to a similar solution 11.5 parts of the volatilized litharge in water and by the same treatment obtained similar results.

The proportions given above may be varied for the production of various shades of color.

Having now described my invention, what I claim as new and desire to secure by Letters Patent, is:—

1. The method of manufacturing basic lead chromate which consists in mixing a paste of volatilized litharge in water with a solution of the described salts which are derivatives of chromic acid with the stronger alkalis, to form the basic lead chromate.

2. The method of manufacturing basic lead chromate which consists in mixing a paste of volatilized litharge in water with a solution of the described salts which are derivatives of chromic acid with the stronger alkalis, and boiling the mixture to form the basic lead chromate.

JOHN A. SCHAEFFER.